(12) United States Patent
Arimoto et al.

(10) Patent No.: US 10,775,518 B2
(45) Date of Patent: Sep. 15, 2020

(54) METHOD FOR MANUFACTURING LAYERED SCINTILLATOR PANEL

(71) Applicant: KONICA MINOLTA INC., Chiyoda-ku (JP)

(72) Inventors: Tadashi Arimoto, Hino (JP); Kei Isoda, Otaku-ku (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/082,492

(22) PCT Filed: Oct. 21, 2016

(86) PCT No.: PCT/JP2016/081222
§ 371 (c)(1),
(2) Date: Sep. 5, 2018

(87) PCT Pub. No.: WO2017/154261
PCT Pub. Date: Sep. 14, 2017

(65) Prior Publication Data
US 2019/0086560 A1    Mar. 21, 2019

(30) Foreign Application Priority Data
Mar. 7, 2016   (JP) ................. 2016-043490

(51) Int. Cl.
*G01T 1/20*   (2006.01)
*G01T 7/00*   (2006.01)
*G21K 4/00*   (2006.01)

(52) U.S. Cl.
CPC .............. *G01T 1/2018* (2013.01); *G01T 1/20* (2013.01); *G01T 7/00* (2013.01); *G21K 4/00* (2013.01)

(58) Field of Classification Search
None
See application file for complete search history.

(56) References Cited

U.S. PATENT DOCUMENTS 6,479,824 B1 * 11/2002 Hoffman ............... G01T 1/2002
250/367
6,749,761 B1 * 6/2004 Andreaco ............. G01T 1/2002
216/24

(Continued)

FOREIGN PATENT DOCUMENTS

| EP | 2988307 | 2/2016 |
| JP | 6-78905 | 3/1994 |

(Continued)

OTHER PUBLICATIONS

Translation of JP 2001318195 A (Year: 2001).*

(Continued)

*Primary Examiner* — David P Porta
*Assistant Examiner* — Mamadou Faye
(74) *Attorney, Agent, or Firm* — Cozen O'Connor

(57) ABSTRACT

Provided is a method of manufacturing a lattice-shaped laminated scintillator panel capable of enlarging the area and increasing the thickness with a means completely different from a conventional technique using a silicon wafer.
A method of manufacturing a laminated scintillator panel having a structure in which a scintillator layer and a non-scintillator layer are repeatedly laminated in a direction substantially parallel to the direction of radiation incidence, the method including: a step of forming a laminate by repeatedly laminating the scintillator layer and the non-scintillator layer; and a joining step of pressurizing the laminate to join the scintillator layer and the non-scintillator layer integrally.

14 Claims, 3 Drawing Sheets

(a)

(b)

(56) References Cited

U.S. PATENT DOCUMENTS

| | | |
|---|---|---|
| 7,492,871 B2 | 2/2009 | Popescu et al. |
| 2002/0022199 A1* | 2/2002 | Tasaki ................ C09K 11/7733 430/328 |
| 2006/0033032 A1* | 2/2006 | Inoue .................... G01T 1/2018 250/370.11 |
| 2012/0134472 A1* | 5/2012 | Kaneko .................. B32B 33/00 378/70 |
| 2015/0107750 A1* | 4/2015 | Huh .................... B32B 37/1018 156/64 |

FOREIGN PATENT DOCUMENTS

| | | |
|---|---|---|
| JP | 11-72596 | 3/1999 |
| JP | 2000-321689 | 11/2000 |
| JP | 2001-318195 | 11/2001 |
| JP | 2001318195 A * | 11/2001 |

OTHER PUBLICATIONS

S. Rutishauser et al., "Structured scintillator for hard x-ray grating interferometry", Applied Physics Letters, vol. 98, 171107, 2011.
Written Opinion of the International Searching Authority issued in the corresponding International Application No. PCT/JP2016/081222 dated Nov. 29, 2016.
International Search Report issued in the corresponding Application No. PCT/JP2016/081222 dated Nov. 29, 2016.
Search Report dated Apr. 10, 2019 issued in European Patent Application No. 16893585.6.
Notification of Reasons for Refusal dated Dec. 24, 2019 issued in Japanese Patent Application No. 2018-503989.

* cited by examiner

METHOD FOR MANUFACTURING LAYERED SCINTILLATOR PANEL

RELATED APPLICATIONS

This is a U.S. National Phase Application under 35 USC 371 of International Application PCT/JP2016/081222 filed on Oct. 21, 2016.

This application claims the priority of Japanese application no. 2016-043490 filed Mar. 7, 2016, the entire content of which is hereby incorporated by reference.

TECHNOLOGICAL FIELD

The present invention relates to a method of manufacturing a laminated scintillator panel used in a Talbot system.

BACKGROUND

Currently, in an X-ray image diagnosis, an absorption image in which X-ray attenuation is imaged after an X-ray has passed through an object is used. On the other hand, an X-ray is a kind of electromagnetic waves, and attention is paid to the wave nature of X-rays, and attempts to image phase change of the X-rays after passing through an object have been recently made. These are called absorption contrast and phase contrast, respectively. The imaging technique using this phase contrast is considered to be more sensitive to soft tissues of a human body, which contains a lot of light elements, because the technique has higher sensitivity to light elements than a conventional absorption contrast.

However, since conventional phase contrast imaging techniques have required use of a synchrotron X-ray source or a minute focus X-ray tube, it has been thought that practical use in general medical facilities is difficult because the former requires a huge facility and the latter is unable to secure sufficient X-ray dose to photograph a human body.

In order to solve this problem, an X-ray image diagnosis (Talbot system) using an X-ray Talbot-Lau interferometer capable of acquiring a phase contrast image using an X-ray source used in medical practice has been conventionally expected.

In the Talbot-Lau interferometer, as shown in FIG. 3, a G0 lattice, a G1 lattice, and a G2 lattice are arranged between a medical X-ray tube and an FPD, respectively, and refraction of X-rays by a subject is visualized as moire fringes. X-rays are irradiated in the longitudinal direction from the X-ray source arranged in an upper portion, and reach an image detector through G0, a subject, G1, and G2.

As a method of manufacturing a lattice, for example, a method in which a silicon wafer having high X-ray transparency is etched to provide lattice-shaped recesses and a heavy metal having high X-ray shielding properties is filled therein is known.

However, with the above-described method, it is difficult to increase the area due to the size of an available silicon wafer, restrictions on an etching apparatus, or the like, and an object to be photographed is limited to a small part. It is not easy to form a deep recess in a silicon wafer by etching, and it is also difficult to evenly fill a metal up to the depth of the recess, and therefore, it is difficult to fabricate a lattice having a thickness enough to sufficiently shield X-rays. For this reason, particularly under high-voltage photographing conditions, X-rays pass through such a lattice, resulting in failure to obtain a favorable image.

On the other hand, it is also considered to adopt a lattice-shaped scintillator having a lattice function added to a scintillator constituting an image detector.

For example, "Structured scintillator for x-ray grating interferometry" (Paul Scherrer Institute (PSI)), *Applied Physics Letter* 98, 171107 (2011) discloses a lattice-shaped scintillator in which a groove of a lattice fabricated by etching a silicon wafer is filled with a phosphor (CsI).

However, in the above method, since a silicon wafer is used as in the above-described method of manufacturing a G2 lattice, problems caused by a silicon wafer such as constraints of the area of the wafer and difficulty in thickening the wafer are not improved. Furthermore, a new problem that emission of CsI attenuates due to repeated collisions on a wall of a silicon lattice, whereby the luminance decreases has been brought about.

DESCRIPTION OF THE RELATED ART

Non Patent Document

Non Patent Document 1: Applied Physics Letter 98, 171107 (2011)

SUMMARY

Problems to be Solved by the Invention

The present invention relates to a method of manufacturing a lattice-shaped laminated scintillator panel capable of enlarging the area and increasing the thickness with a means completely different from a conventional technique using a silicon wafer.

Means for Solving the Problems

In order to realize at least one of the above-described objects, a method of manufacturing a laminated scintillator panel reflecting one aspect of the present invention includes the following.

A method of manufacturing a laminated scintillator panel having a structure in which a scintillator layer and a non-scintillator layer are repeatedly laminated in a direction substantially parallel to the direction of radiation incidence, the method including: a step of forming a laminate by repeatedly laminating the scintillator layer and the non-scintillator layer; and a joining step of pressurizing the laminate to join the scintillator layer and the non-scintillator layer integrally.

Effects of the Invention

According to the present invention, a lattice-shaped laminated scintillator panel can be provided by a simple method in which a scintillator layer and a non-scintillator layer are laminated and joined, instead of performing operations such as etching of a silicon wafer and filling of a phosphor into a groove. According to such a method, it is possible to increase the area and thickness, and the lattice pitch is arbitrarily adjustable. The laminated scintillator panel according to the present invention can be used as a scintillator having a function of a lattice for a Talbot-Lau interferometer.

The laminated scintillator of the present invention has high luminance and is suitable for large area and thick film. This enables high-pressure imaging as well, enabling photography of thick subjects such as thoracoabdominal parts, thighs, elbows, knees, or hip joints.

Conventionally, in diagnostic imaging of cartilage, MRI is the mainstream, there are drawbacks that the photographing cost is high and the photographing time is long because large-scale equipment is used. On the other hand, according to the present invention, it is possible to photograph soft tissue such as cartilage, muscle tendon, ligament, and visceral tissue with a faster x-ray image at lower cost. Therefore, it can be widely applied to orthopedic diseases such as rheumatoid arthritis or knee osteoarthritis and image diagnosis of soft tissue including breast cancer.

DETAILED DESCRIPTION OF EMBODIMENTS

A method of manufacturing the laminated scintillator panel of the present invention will be described.

Figure 1:
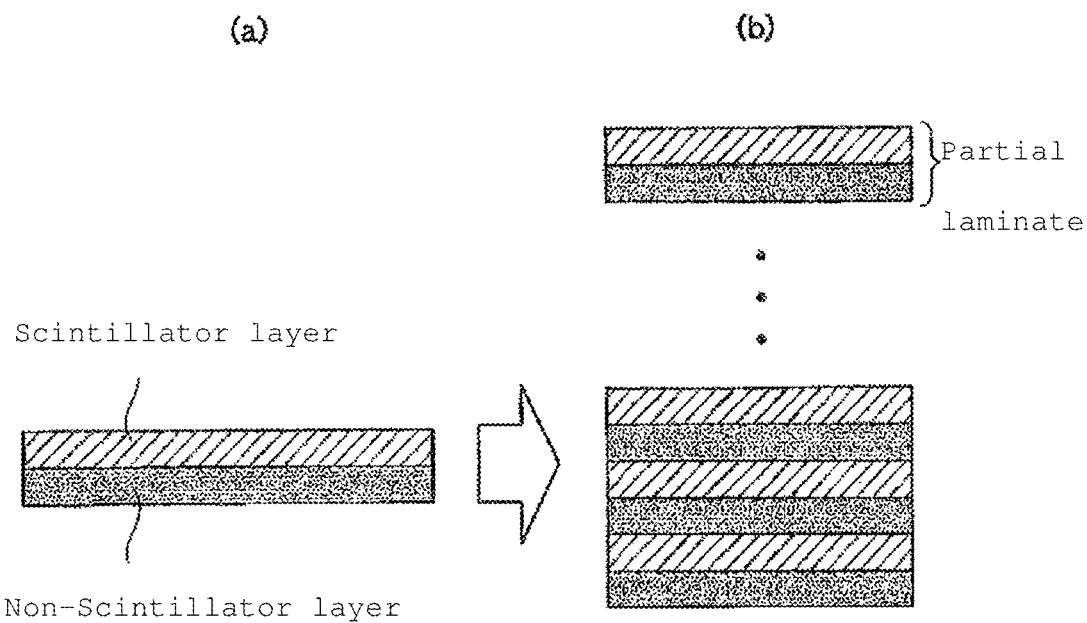
FIG. 1 is a schematic sectional diagram of a method of manufacturing a laminated scintillator panel.
Figure 2:
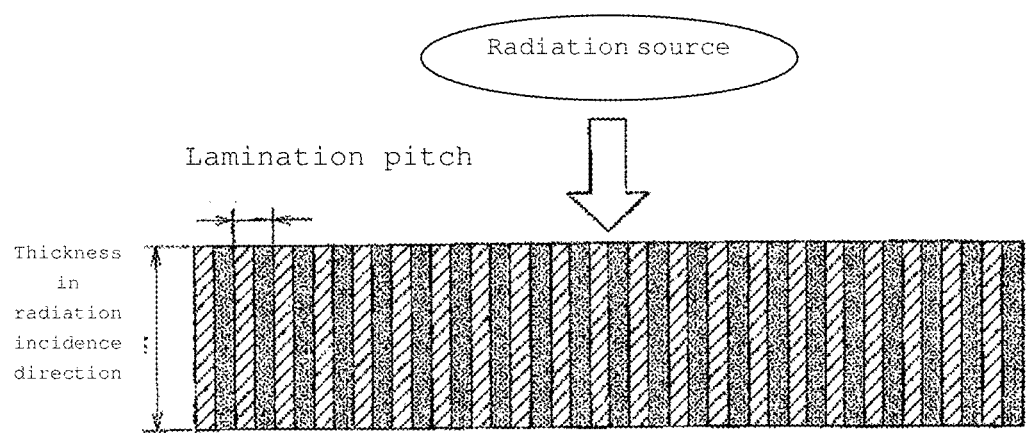
FIG. 2 is a schematic diagram of a laminated scintillator panel.
Figure 3:
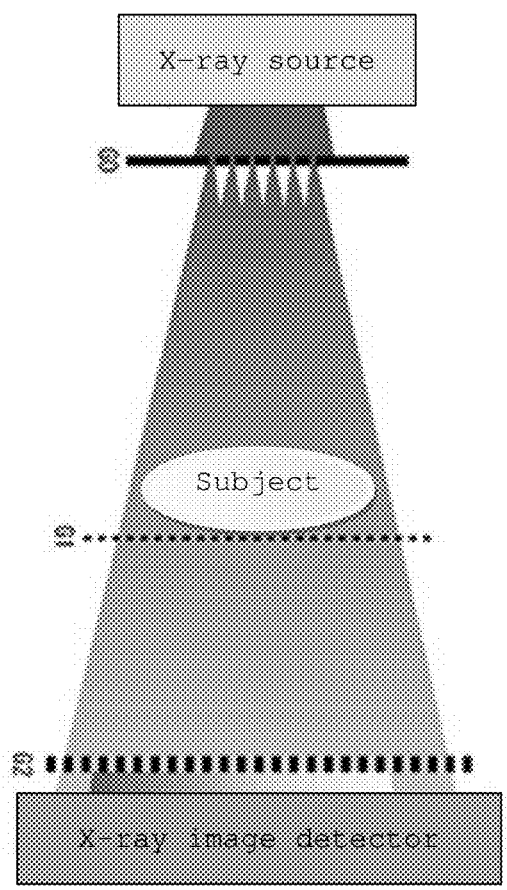
FIG. 3 is a schematic configuration diagram of a Talbot scintillator.

As shown in FIG. 2, a laminated scintillator panel has a structure in which a scintillator layer and a non-scintillator layer are repeatedly laminated in a direction substantially parallel to the direction of radiation incidence.

By facing the radiation incidence surface or the opposite surface thereof the laminated scintillator panel to a photoelectric conversion panel, it is possible to convert an emission of the scintillator by radiation into an electric signal to acquire a digital image.

Substantially parallel is almost parallel, and perfect parallel and some inclination also fall within the category of substantially parallel.

The thickness (hereinafter referred to as lamination pitch) of a pair of a scintillator layer and a non-scintillator layer in the lamination direction and the ratio (hereinafter duty ratio) of the thickness of the scintillator layer to the thickness of the non-scintillator layer in the lamination direction are derived from Talbot interference conditions, and in general, the lamination pitch is from 0.5 to 50 μm and the duty ratio is preferably from 30/70 to 70/30. In order to obtain a diagnostic image with a sufficient area, it is preferable that the number of repeated lamination layers of the lamination pitch is from 1,000 to 500,000.

The thickness of the laminated scintillator panel of the present invention in the radiation incidence direction is preferably from 10 to 1,000 μm, and more preferably from 100 to 500 μm. When the thickness in the radiation incidence direction is smaller than the lower limit value of the above range, the light emission intensity of the scintillator is weakened, and the image quality is deteriorated. When the thickness in the radiation incidence direction is larger than the upper limit of the above range, the distance of light emitted from the scintillator to a photoelectric conversion panel becomes long, and therefore, light easily diffuses and the sharpness deteriorates.

The scintillator layer in the present invention is a layer containing a scintillator as a main component, and preferably contains scintillator particles.

As the scintillator according to the present invention, substances capable of converting radiation such as X rays into radiation having different wavelengths such as visible light can be appropriately used. Specifically, scintillators and phosphors described in "Phosphor Handbook" (edited by Phosphor Research Society, Ohmsha Ltd., 1987) ranging from page 284 to page 299, substances listed in the web site "Scintillation Properties (http://scintillator.lbl.gov/)" of the US Lawrence Berkeley National Laboratory, or the like may be used, and substances not mentioned here can also be used as scintillators as long as they are "substances capable of converting radiation such as X-rays into radiation having different wavelengths such as visible light".

Specific examples of the composition of the scintillator include the following examples. First, a metal halide phosphor represented by Basic composition formula (I): $M_I X \cdot aM_{II} X'_2 \cdot bM_{III} X''_3$: zA can be mentioned.

In the basic composition formula (I), $M_I$ represents at least one element selected from the group consisting of elements capable of becoming monovalent cations, such as lithium (Li), sodium (Na), potassium (K), rubidium (Rb), cesium (Cs), thallium (Tl), and silver (Ag).

$M_{II}$ represents at least one element selected from the group consisting of elements capable of becoming divalent cations, such as beryllium (Be), magnesium (Mg), calcium (Ca), strontium (Sr), barium (Ba), nickel (Ni), copper (Cu), zinc (Zn), and cadmium (Cd).

$M_{III}$ represents at least one element selected from the group consisting of scandium (Sc), yttrium (Y), aluminum (Al), gallium (Ga), indium (In), and elements belonging to the lanthanoid.

X, X', and X" each represent a halogen element, and may be different or the same.

A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

a, b, and z each independently represent a numerical value within the range of $0 \le a < 0.5$, $0 \le b < 0.5$, $0 < z < 1.0$.

Rare earth activated metal fluorohalide phosphors represented by Basic composition formula (II): $M_{II}FX$: zLn can also be mentioned.

In the basic composition formula (II), $M_{II}$ represents at least one alkaline earth metal element, Ln represents at least one element belonging to the lanthanoid, and X represents at least one halogen element. z satisfies $0 < z \le 0.2$.

Rare earth oxysulfide phosphors represented by Basic composition formula (III): $Ln_2O_2S$: zA can also be mentioned.

In the basic composition formula (III), Ln represents at least one element belonging to the lanthanoid, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z satisfies $0 < z < 1$.

In particular, $Gd_2O_2S$ using gadolinium (Gd) as Ln is preferable since it is known to exhibit high emission characteristics in a wavelength region where the sensor panel is most likely to receive light by using terbium (Tb), dysprosium (Dy) or the like as the element type of A.

Metal sulfide-based phosphors represented by Basic composition formula (IV): $M_{II}S$: zA can also be mentioned.

In the basic composition formula (IV), $M_{II}$ represents at least one element selected from the group consisting of elements capable of becoming divalent cations, such as alkaline earth metals, Zn (zinc), Sr (strontium), and Ga (gallium), and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z satisfies 0<z<1.

Metal oxoacid salt-based phosphors represented by Basic composition formula (V): $M_{IIa}(AG)_b$: zA can also be mentioned.

In the basic composition formula (V), $M_{II}$ represents a metal element which can be a cation, (AG) represents at least one oxo acid group selected from the group consisting of phosphate, borate, silicate, sulfate, tungstate and aluminate, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

a and b represent all possible values depending on the valence of the metal and oxo acid groups. z satisfies 0<z<1.

A metal oxide-based phosphor represented by Basic composition formula (VI): $M_aO_b$: zA can be mentioned.

In the basic composition formula (VI), M represents at least one element selected from metal elements which can become cations.

A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

a and b represent all possible values depending on the valence of the metal and oxo acid groups. z satisfies 0<z<1.

Besides, a metal acid halide-based phosphor represented by Basic composition formula (VII): LnOX: zA can be mentioned.

In the basic composition formula (VII), Ln represents at least one element belonging to the lanthanoid, X represents at least one halogen element, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z satisfies 0<z<1.

The average particle size of the scintillator particles is selected according to the thickness of a scintillator layer in the lamination direction, and is preferably 100% or less, more preferably 90% or less, with respect to the thickness in the lamination direction of the scintillator layer. When the average particle diameter of the scintillator particles exceeds the above range, disturbance of the lamination pitch becomes large and the Talbot interference function decreases.

The content of the scintillator particles in the scintillator layer is preferably 30 vol % or more, more preferably 50 vol % or more, still more preferably 70 vol % or more in consideration of luminescent properties.

The non-scintillator layer in the present invention does not contain a scintillator as a main component, and the content of the scintillator in the non-scintillator layer is less than 10 vol %, preferably less than 1 vol %, and most preferably 0 vol %.

Preferably, the non-scintillator layer contains a variety of glasses, polymer materials, metals, and the like as main components. These may be used singly or in combination of a plurality of them.

Specifically, plate glass such as quartz, borosilicate glass, or chemically tempered glass; ceramics such as sapphire, silicon nitride, or silicon carbide;

semiconductor such as silicon, germanium, gallium arsenide, gallium phosphide, or gallium nitride;

polymers such as: polyester such as polyethylene terephthalate (PET) or polyethylene naphthalate (PEN); aliphatic polyamide such as nylon; aromatic polyamide (aramid); polyimide; polyamide imide; polyether imide; polyethylene; polypropylene; polycarbonate; triacetate; cellulose acetate; epoxy; bismaleimide; polylactic acid; sulfur-containing polymers such as polyphenylene sulfide or polyether sulfone; polyether ether ketone; fluororesin; acrylic resin; or polyurethane;

carbon fibers, glass fibers or the like (in particular, fiber reinforced resin sheets including such fibers);

metal foil such as aluminum, iron, copper; bionanofibers including chitosan, cellulose, or the like can be used.

As a non-scintillator layer, a polymer film is preferably used as a main component from the viewpoint of manufacturing handling, and a material transparent to an emission wavelength of a scintillator is particularly preferable. By making the non-scintillator layer transparent, the light emission of the scintillator propagates not only within the scintillator layer but also into the non-scintillator layer, and the amount of light reaching a sensor increases and the luminance improves. The transmittance of the non-scintillator layer is preferably 80% or more.

The present invention includes the steps of: laminating a scintillator layer and a non-scintillator layer; and joining the scintillator layer and the non-scintillator layer. Joining in the present invention means bonding the scintillator layer and the non-scintillator layer to integrate them. As a joining method, both of them can be adhered via an adhesive layer, and from a viewpoint of process simplification, it is preferable to preliminarily contain an adhesive resin in the scintillator layer or the non-scintillator layer, and bring them into close contact with each other by pressure, thereby joining them without interposing an adhesive layer. Heating in a pressurized state is more preferable because a substance having adhesiveness is melted or cured to strengthen adhesion. It is also possible to coat the surface of the non-scintillator layer with a composition capable of forming a scintillator layer, or to join the scintillator layer and the non-scintillator layer by further removing the solvent, as needed.

An adhesive resin may be contained in either a scintillator layer or a non-scintillator layer, and particularly preferably, a scintillator layer contains an adhesive resin as a binder for scintillator particles. The adhesive resin is preferably a material that is transparent to the emission wavelength of the scintillator so as not to inhibit the propagation of light emitted from the scintillator.

The adhesive resin is not particularly limited as long as the object of the present invention is not impaired, and examples thereof include natural polymers such as proteins such as gelatin, polysaccharides such as dextran, or gum arabic; and synthetic polymeric substances such as polyvinyl butyral, polyvinyl acetate, nitrocellulose, ethylcellulose, vinylidene chloride·vinyl chloride copolymer, poly(meth)acrylate, vinyl chloride·vinyl acetate copolymer, polyurethane, cellulose acetate butyrate, polyvinyl alcohol, polyester, epoxy resin, polyolefin resin, and polyamide resin. These resins may be crosslinked with a crosslinking agent such as epoxy or isocyanate, and these adhesive resins may be used singly or in combination of two or more kinds. The adhesive resin may be either a thermoplastic resin or a thermosetting resin.

The content of an adhesive resin contained in the scintillator layer is preferably from 1 to 70 vol %, more preferably from 5 to 50 vol %, and still more preferably from 10 to 30 vol %. When the content is lower than the lower limit of the above range, sufficient adhesiveness is not obtained, and conversely, when the content is higher than the upper limit of the above range, the content of the scintillator becomes insufficient and the amount of luminescence decreases.

The scintillator layer may be formed by coating a composition in which the scintillator particles and an adhesive resin are dissolved or dispersed in a solvent, or may be formed by coating a composition prepared by heating and melting a mixture containing the scintillator particles and an adhesive resin.

When coating the composition in which the scintillator particles and the adhesive resin are dissolved or dispersed in a solvent, examples of usable solvents include: lower alcohols such as methanol, ethanol, isopropanol, and n-butanol; ketones such as acetone, methyl ethyl ketone, methyl isobutyl ketone, and cyclohexanone; esters of lower fatty acids and lower alcohols such as methyl acetate, ethyl acetate, and n-butyl acetate; ethers such as dioxane, ethylene glycol monoethyl ether, ethylene glycol monomethyl ether; aromatic compounds such as toluol and xylol; halogenated hydrocarbons such as methylene chloride and ethylene chloride; and mixtures thereof. A variety of additives such as a dispersant for improving dispersibility of scintillator particles in the composition and a curing agent or a plasticizer for improving the bonding force between an adhesive resin and scintillator particles in a scintillator layer after formation may be mixed in the composition.

Examples of the dispersant used for such purpose include phthalic acid, stearic acid, caproic acid, and lipophilic surfactant.

Examples of the plasticizer include: phosphoric acid esters such as triphenyl phosphate, tricresyl phosphate, and diphenyl phosphate; phthalic acid esters such as diethyl phthalate and dimethoxyethyl phthalate; glycolic acid esters such as ethyl phthalyl ethyl glycolate and butyl phthalyl butyl glycolate; and polyesters of polyethylene glycol and aliphatic dibasic acids such as polyesters of triethylene glycol and adipic acid, and polyesters of diethylene glycol and succinic acid. As the curing agent, a known curing agent for a thermosetting resin can be used.

When heating and melting the mixture containing the scintillator particles and the adhesive resin, it is preferable to use a hot-melt resin as the adhesive resin. As the hot-melt resin, for example, one mainly composed of a polyolefin-based, polyamide-based, polyester-based, polyurethane-based, or acrylic-based resin can be used. Among these, from viewpoints of light permeability, moisture resistance, and adhesiveness, those based on a polyolefin resin as a main component are preferable. As the polyolefin-based resin, for example, ethylene-vinyl acetate copolymer (EVA), ethylene-acrylic acid copolymer (EAA), an ethylene-acrylic acid ester copolymer (EMA), ethylene-methacrylic acid copolymer (EMAA), ethylene-methacrylic acid ester copolymer (EMMA), an ionomer resin or the like can be used. These resins may be used as a so-called polymer blend in which two or more kinds of resins are combined.

There are no particular restrictions on means for coating a composition for forming a scintillator layer, and usual coating means such as a doctor blade, a roll coater, a knife coater, an extrusion coater, a die coater, a gravure coater, a lip coater, a capillary coater, or a bar coater can be used.

In the present invention, there is a step of bonding the scintillator layer and the non-scintillator layer after repeatedly laminating the scintillator layer and the non-scintillator layer.

There are no particular restrictions on the method of repeatedly laminating the scintillator layer and the non-scintillator layer, and an individually formed scintillator layer and non-scintillator layer may be divided into a plurality of sheets, and then the sheets may be alternately repeatedly laminated.

In the present invention, it is preferable that a plurality of partial laminates in which the scintillator layer and the non-scintillator layer are bonded to each other are formed, and then the plurality of partial laminates are laminated to form the laminate since it is easy to adjust the number of layers and the thickness of the laminate.

For example, a partial laminate composed of a pair of scintillator layer and non-scintillator layer may be formed in advance, the partial laminate may be divided into a plurality of sheets, and the sheets may be laminated repeatedly.

When the partial laminate composed of the scintillator layer and the non-scintillator layer has a film shape that can be wound up, efficient lamination is possible by winding the film on a core. The winding core may be cylindrical or a plate. More efficiently, the repeated laminate of the scintillator layer and the non-scintillator layer fabricated by the above method may be bonded (integrated) by pressurization, heating, or the like, and then divided into a plurality of sheets, and the sheets may be repeatedly laminated.

There is no particular restriction on the method of forming a partial laminate composed of a scintillator layer and a non-scintillator layer, and a scintillator layer may be formed by selecting a polymer film as a non-scintillator layer and coating a composition containing scintillator particles and an adhesive resin on one side thereof. A composition containing scintillator particles and an adhesive resin may be coated on both sides of a polymer film.

As described above, when a partial laminate is formed by coating a composition containing scintillator particles and an adhesive resin on a polymer film, it is possible to simplify a process and to easily divide the partial laminate into a plurality of sheets. The dividing method is not particularly limited, and a usual cutting method is selected.

A transfer substrate coated with a scintillator layer in advance may be transferred onto a film composed of a non-scintillator layer. As needed, the transfer substrate is removed by means such as peeling.

In the present invention, the scintillator layer and the non-scintillator layer are integrally bonded by pressurizing the laminate in such a manner that the scintillator layer and the non-scintillator layer are in a substantially parallel direction to the direction of radiation incidence.

By heating a repeated laminate of a plurality of scintillator layers and non-scintillator layers in a pressurized state so as to obtain a desired size, the lamination pitch can be adjusted to a desired value.

There is no particular restriction on the method of pressurizing the repeated laminate of the plurality of scintillator layers and the non-scintillator layer to have a desired size, and it is preferable to apply pressure in a state in which a spacer such as a metal is provided in advance so that the laminate is not compressed less than a desired size. The pressure at that time is preferably from 1 MPa to 10 GPa. When the pressure is lower than the lower limit of the above range, there is a possibility that a resin component contained in the laminate may be not deformed to a predetermined size. When the pressure is higher than the upper limit of the above range, a spacer may be deformed, and the laminate may be compressed less than a desired size.

By heating the laminate in a pressurized state, bonding can be made more robust.

Depending on the kind of a resin, it is preferable to heat a repeated laminate of a plurality of scintillator layers and non-scintillator layers for about from 0.5 to 24 hours at a temperature equal to or higher than the glass transition point for a thermoplastic resin and at a temperature equal to or higher than the curing temperature for a thermosetting resin.

The heating temperature is preferably from 40° C. to 250° C. in general. When the temperature is lower than the lower limit of the above range, the fusion or curing reaction of the resin may be insufficient, and there is a possibility of poor bonding or returning to the original size when releasing compression. When the temperature is higher than the upper limit of the above range, there is a possibility that the resin deteriorates and the optical characteristics are impaired. There are no particular restrictions on the method of heating the laminate under pressure, and a press equipped with a heating element may be used, the laminate may be oven-heated in a state of being enclosed in a box-shaped jig so as to have a predetermined size, or a heating element may be mounted on a box-shaped jig.

As a state before a repeated laminate of a plurality of scintillator layers and non-scintillator layers is pressurized, it is preferable that voids exist inside the scintillator layer, inside the non-scintillator layer, or in the interface between the scintillator layer and the non-scintillator layer. When pressure is applied in the absence of any voids, a part of a constituent material flows out from an end face of the laminate to cause disorder in the lamination pitch or return to the original size when releasing the pressure. When a void exists, the void functions as a cushion even when pressurized, and the laminate can be adjusted to an arbitrary size in the range until the void becomes zero, and in other words, the lamination pitch can be adjusted to an arbitrary value. The porosity is calculated from the following formula using a measured volume (area×thickness) of the laminate and the theoretical volume (weight÷density) of the laminate.

(measured volume of laminate−theoretical volume of laminate)÷theoretical volume of laminate×100

When the area of the laminate is constant, the porosity is calculated from the measured thickness of the laminate and the theoretical thickness (weight÷density÷area) of the laminate according to the following formula.

(measured thickness of laminate−theoretical thickness of laminate)÷theoretical thickness of laminate×100

The porosity of the scintillator layer after pressurizing is preferably 30 vol % or less. When the porosity exceeds the above range, the packing ratio of the scintillator decreases and the luminance decreases.

As means for providing voids in the scintillator layer or the non-scintillator layer, for example, bubbles may be contained in the layer in the process of manufacturing the scintillator layer or the non-scintillator layer, or hollow polymer particles may be added. On the other hand, even when irregularities are present on the surface of the scintillator layer or the non-scintillator layer, the same effect can be obtained since a void is formed at the contact interface between the scintillator layer and the non-scintillator layer. As means for providing irregularities on the surfaces of the scintillator layer or the non-scintillator layer, for example, an irregularity-forming treatment such as a blast treatment or an emboss treatment may be applied to the surface of the layer, or irregularities may be formed on the surface by incorporating a filler in the layer. When a scintillator layer is formed by coating a composition containing scintillator particles and an adhesive resin on a polymer film, irregularities are formed on the surface of the scintillator layer, and voids can be formed at the contact interface with the polymer film. The size of the irregularities can be arbitrarily adjusted by controlling the particle size and dispersibility of the filler.

Since a radiation source emitting radiation such as X-rays is generally a point wave source, when individual scintillator layers and non-scintillator layers are formed completely in parallel, X-rays obliquely enter the peripheral region of a laminated scintillator. As a result, in the peripheral region, so-called vignetting, in which radiation is not sufficiently transmitted, occurs. Vignetting becomes a serious problem as the scintillator becomes larger in area.

This problem can be improved by making individual scintillator layers and non-scintillator layers parallel to the radiation by bending the laminated scintillator panel or by forming the laminated scintillator panel to have an inclination structure.

Figure 4:
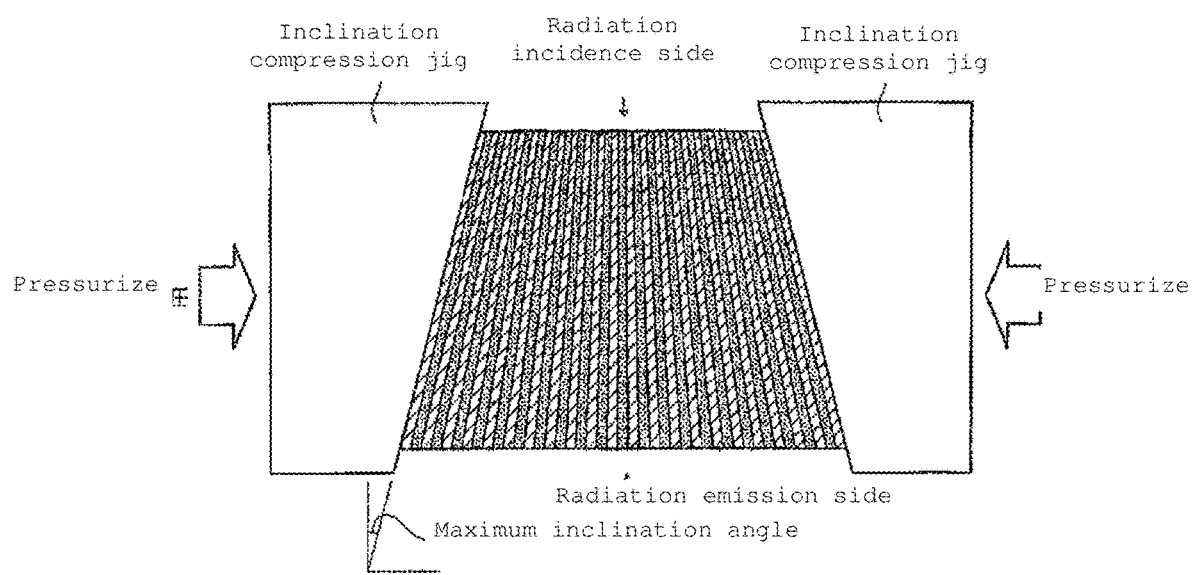
FIG. 4 is a schematic diagram of a laminated scintillator panel with inclination.

In order for the laminated scintillator panel to have an inclination structure, for example, in a step of pressurizing the repeated laminate of the plurality of scintillator layers and non-scintillator layers, the pressurizing direction is made oblique, thereby forming an inclination structure having a trapezoidal cross section as shown in FIG. 4. The inclination angle is the maximum at an end side of the laminated scintillator panel, and it becomes continuously close to parallel toward the center. The maximum inclination angle is determined by the size of the laminated scintillator panel or the distance between the laminated scintillator panel and the radiation source, and is usually from 0 to 10°. As a pressurizing method for forming the inclination structure, for example, a pressurizing jig having a predetermined inclination as shown in FIG. 4 is used. The inclination angle 0° means parallel, and the above range is included in the concept of "substantially parallel" in the specification of the present application.

At the interface between the scintillator layer and the non-scintillator layer of the laminated scintillator panel, for the purpose of improving sharpness, a light-shielding layer for suppressing diffusion of light emitted from the scintillator may be provided. The light-shielding layer is not particularly limited as long as it has a function of suppressing propagation of light emitted from the scintillator, and may have, for example, a light-reflecting function, or may have a light-absorbing function.

In order not to significantly impair the luminance, the light-shielding layer is preferably inserted at a ratio of one layer to a lamination pitch of from five layers to 500 layers, and more preferably is inserted at a ratio of one layer to a lamination pitch of from 10 layers to 100 layers. When the lamination pitch falls below the lower limit of a specified value, the sharpness improves but the luminance greatly decreases, and when the lamination pitch exceeds the upper limit, the effect of improving the sharpness is impaired.

Means for providing the light-shielding layer is not particularly restricted, and dye or pigment, or ink containing metal nanoparticles may be applied, or a metal thin film may be provided by a gas phase method such as vapor deposition or sputtering.

In the present invention, it is preferable that a plurality of scintillator layers and non-scintillator layers are bonded and then a bonding end face is planarized. In particular, scattering of a scintillator light at the bonding end face can be suppressed by planarizing the face on the radiation incidence side, the side opposite thereto, or both sides, thereby improving the sharpness. The planarizing method is not particularly limited, and energy such as ions, plasma, electron beam, or the like may be irradiated in addition to machining such as cutting, grinding, and polishing. In the case of machining, it is preferable to work in a direction parallel to a laminated structure so as not to damage the lamination structure of scintillator layers and non-scintillator layers.

Since the thickness of the laminated scintillator panel in the present invention in the direction of incidence of radiation is as thin as several mm or less, in order to maintain the lamination structure, it is preferable that the surface on the radiation incidence side, the side opposite thereto, or both surfaces are bonded and held on a support.

As the support, a variety of glasses, polymer materials, metals, or the like which can transmit radiation such as X-rays can be used, and examples thereof include: glass sheets such as quartz, borosilicate glass, and chemically tempered glass; ceramic substrates such as sapphire, silicon nitride, and silicon carbide; semiconductor substrates (photoelectric conversion panels) such as silicon, germanium, gallium arsenide, gallium phosphorus, and gallium nitrogen; polymer films (plastic films) such as cellulose acetate films, polyester films, polyethylene terephthalate films, polyamide films, polyimide films, triacetate films, and polycarbonate films; metal sheets such as aluminum sheets, iron sheets, and copper sheets; metal sheets having a coating layer of the metal oxide; carbon fiber reinforced resin (CFRP) sheets; and amorphous carbon sheets. The thickness of the support is preferably from 50 µm to 2,000 µm, and more preferably from 50 to 1,000 µm.

A method of laminating a laminated scintillator panel and a support is not particularly specified, and for example, an adhesive, a double-sided tape, a hot-melt sheet, or the like can be used. After laminating the laminated scintillator panel and the support, the surface opposite to the bonding surface may be planarized.

Between the laminated scintillator panel and the support may be provided a layer that reflects light emitted from the scintillator or a layer that absorbs light emitted from the scintillator depending on an intended use. The luminance is improved by providing a layer that reflects light emitted from the scintillator, and the sharpness is improved by providing a layer that absorbs light emitted from the scintillator. The support itself may have a function of reflecting or absorbing light emitted from the scintillator.

By facing the laminated scintillator panel of the present invention to a photoelectric conversion panel, it is possible to convert light emitted from the scintillator caused by radiation into an electric signal to acquire a digital image. Although the laminated scintillator panel and the photoelectric conversion panel may be faced to each other in a non-contact manner, in order to reduce the optical loss at the interface between the laminated scintillator panel and the photoelectric conversion panel, it is preferable that they are bonded with a transparent material having a refractive index exceeding 1.0 (air). The bonding method of the laminated scintillator panel and the photoelectric conversion panel is not particularly specified, and for example, an adhesive, a double-sided tape, a hot-melt sheet or the like can be used.

The facing laminated scintillator panel and the photoelectric conversion panel may be curved so as to prevent the aforementioned vignetting. In this case, the photoelectric conversion panel is preferably a flexible material.

According to the present invention as described above, a laminated scintillator panel capable of enlarging the area and increasing the thickness with a concept totally different from the use of a silicon wafer can be provided.

According to the present invention, it is possible to provide a laminated scintillator panel by a simple method of going through a process of joining a scintillator layer and a non-scintillator layer, it is also possible to enlarge the area of the panel or to increase the thickness of the panel, which has been conventionally difficult, and it is also possible to arbitrarily adjust the lamination pitch. Therefore, the laminated scintillator panel according to the present invention can be used as a scintillator for a Talbot system. By changing the scintillator particles of the present invention to high-X-ray-absorbing particles such as heavy metals, the present invention can also be applied to manufacturing methods of a variety of lattices for Talbot such as G0 lattice, G1 lattice, and G2 lattice.

EXAMPLES

Hereinafter, the present invention will be described by way of Examples, but the present invention is not limited to such Examples in any manner.

Example 1

$Gd_2O_2S$: Tb particles having an average particle diameter of 2 µm and an ethylene-vinyl acetate based hot melt resin (Evaflex EV150, melting point=61° C., manufactured by Du Pont-Mitsui Polychemicals Co., Ltd.) were mixed in such a manner that the solid content ratio (volume fraction) was 75/25, thereby obtaining a composition for forming a scintillator layer. This composition was melted at 200° C. and coated on a PET film (non scintillator layer) having the theoretical film thickness of 3 µm (calculated from the weight) with a die coater in such a manner that the theoretical film thickness was 3 µm (calculated from the weight), thereby preparing a partial laminate composed of a scintillator layer and a non-scintillator layer. Thereafter, 20,000 sheets of the partial laminates cut into 120 mm×3 mm were laminated. The actual film thickness of this laminate was 140 mm. Since the theoretical film thickness of this laminate is 120 mm, the porosity was 17%.

Subsequently, a pressure of 0.2 GPa was applied in parallel to the lamination surface using a metal jig in such a manner that the film thickness of the laminate was 120 mm and the laminate in this state was heated at 100° C. for 1 hour to prepare a laminated block (120 mm×120 mm×3 mm) composed of 20,000 layers of partial laminates. The porosity of the laminate after pressurization was 0%.

One side (120 mm×120 mm surface) of the laminated block was flattened by lathe machining, then an epoxy adhesive was applied thereto, and the laminated block was bonded to a CFRP plate having a thickness of 0.5 mm Thereafter, the laminated scintillator panel (120 mm×120 mm×0.3 mm) was obtained by lathe cutting until the thickness of the laminated block became 0.3 mm.

As a result of observing the surface (120 mm×120 mm surface) of the fabricated laminated scintillator panel with a microscope, it was confirmed that the partial laminate was precisely aligned with a lamination pitch of 6 µm.

Example 2

$Gd_2O_2S$: Tb particles having an average particle diameter of 2 µm and a polyester resin (VYLON 200 manufactured by Toyobo Co., Ltd., Tg=67° C.) were mixed in a MEK solvent in such a manner that the solid content ratio (volume fraction) was 75/25, thereby obtaining a composition for forming a scintillator layer. This composition was melted and coated on a PET film (non scintillator layer) having the theoretical film thickness of 3 µm (calculated from the weight) with a die coater in such a manner that the theoretical film thickness was 3 µm (calculated from the weight), thereby preparing a partial laminate composed of a scintillator layer and a non-scintillator layer. Thereafter, 20,000 sheets of the partial laminates cut into 120 mm×3 mm were laminated. The actual film thickness of this laminate was 160 mm. Since the theoretical film thickness of this laminate is 120 mm, the porosity was 33%.

Subsequently, a pressure of 0.2 GPa was applied in parallel to the lamination surface using a metal jig in such a manner that the film thickness of the laminate was 120 mm and the laminate in this state was heated at 100° C. for 1 hour to prepare a laminated block (120 mm×120 mm×3 mm) composed of 20,000 layers of partial laminates. The porosity of the laminate after pressurization was 0%.

The above-described laminated film was processed in a similar manner to Example 1 to obtain a laminated scintillator panel (120 mm×120 mm×0.3 mm).

As a result of observing the surface (120 mm×120 mm surface) of the fabricated laminated scintillator panel with a microscope, it was confirmed that the partial laminate was precisely aligned with a lamination pitch of 6 μm.

Example 3

A laminated scintillator panel was fabricated in a similar manner to Example 2 except that 20,000 sheets of partial laminates were laminated and then the laminate was pressed in such a manner that the film thickness of the laminate was 140 mm. It was confirmed that the porosity of the present laminate after pressurization was 17%, and the partial laminates were accurately arranged with a lamination pitch of 7 μm.

Example 4

In Example 1, after laminating 20,000 sheets of partial laminates cut into 120 mm×3 mm, the laminate was pressed in such a manner that the laminate had an inclination structure having a trapezoidal cross section as shown in FIG. 4 using a metal inclination jig with an inclination angle of 2°, and the laminate in this state was heated at 100° C. for 1 hour to prepare a laminated block (120 mm×120 mm (average value because of a slope)×3 mm) composed of 20,000 layers of minimum lamination unit).

The surface on the radiation incidence side (see FIG. 4) of the laminated block was flattened by lathe machining, then an epoxy adhesive was applied thereto, and the laminated block was bonded to a CFRP plate having a thickness of 0.5 mm Thereafter, the laminated scintillator panel (120 mm×120 mm×0.3 mm) was obtained by lathe cutting until the thickness of the laminated block became 0.3 mm.

The above-described laminated scintillator panel was bonded to a photoelectric conversion panel with an optical double-sided tape (CS9861US manufactured by Nitto Denko Corporation) on the surface of the radiation emission side (see FIG. 4), and an X-ray image was acquired by X-ray irradiation under a condition of a tube voltage of 40 kV.

It was confirmed that by adjusting the distance between the laminated scintillator panel and the X-ray source to 172 cm, the angle of incidence of the X-ray coincides with the angle of the laminated structure, and that uniform light emission (luminance) can be obtained in the panel surface. This indicates that vignetting was prevented by making the laminated scintillator panel an inclination structure.

The invention claimed is:

1. A method of manufacturing a laminated scintillator panel having a structure in which a scintillator layer and a non-scintillator layer are repeatedly laminated in a direction substantially parallel to the direction of radiation incidence, the method comprising: a step of forming a laminate by repeatedly laminating the scintillator layer and the non-scintillator layer; and a joining step of pressurizing the laminate to join the scintillator layer and the non-scintillator layer integrally,
wherein:
the step of forming the laminate comprises a step of forming a plurality of partial laminates in which the scintillator layer and the non-scintillator layer are joined, and a step of laminating the plurality of partial laminates to form the laminate, and
each of the partial laminates is formed by coating a composition containing scintillator particles and an adhesive resin on a polymer film.

2. The method of manufacturing a laminated scintillator panel according to claim 1 , wherein the scintillator layer contains at least one adhesiveness resin.

3. The method of manufacturing a laminated scintillator panel according to claim 1, wherein the non-scintillator layer is composed mainly of a polymer film.

4. The method of manufacturing a laminated scintillator panel according to claim 1, wherein, in the joining step, the laminate is pressurized in such a manner that the scintillator layer and the non-scintillator layer are substantially parallel to the direction of radiation incidence.

5. The method of manufacturing a laminated scintillator panel according to claim 1, wherein, in the joining step, the laminate is heated in a pressurized state.

6. The method of manufacturing a laminated scintillator panel according to claim 1, further comprising a step of flattening a joining end face of the laminate joined in the joining step.

7. The method of manufacturing a laminated scintillator panel according to claim 1, further comprising a step of bonding the laminate joined in the joining step to a support.

8. A method of manufacturing a lattice for Talbot selected from G0 lattice, G1 lattice and G2 lattice, comprising a step of forming a laminate by applying a composition containing high-X-ray-absorbing particles and an adhesive resin on a polymer film to form a partial laminate and laminating a plurality of the partial laminate to form the laminate, and a joining step of pressurizing the laminate in such a manner that the partial laminates are substantially parallel to the direction of radiation incidence to join the partial laminates integrally.

9. The method of manufacturing a lattice for Talbot according to claim 8, wherein, in the joining step, the laminate is heated in a pressurized state.

10. The method of manufacturing a lattice for Talbot according to claim 8, further comprising a step of flattening a joining end face of the laminate joined in the joining step.

11. The method of manufacturing a lattice for Talbot according to claim 8, further comprising a step of bonding the laminate joined in the joining step to a support.

12. The method of manufacturing a lattice for Talbot according to claim 9, further comprising a step of flattening a joining end face of the laminate joined in the joining step.

13. The method of manufacturing a lattice for Talbot according to claim 9, further comprising a step of bonding the laminate joined in the joining step to a support.

14. The method of manufacturing a lattice for Talbot according to claim 10, further comprising a step of bonding the laminate joined in the joining step to a support.

* * * * *